Aug. 27, 1968   JUNSHIRO SHINGA   3,398,817
CONTROL SYSTEM FOR MOTOR VEHICLE ACCELERATOR PEDAL
Filed May 25, 1966   2 Sheets-Sheet 1
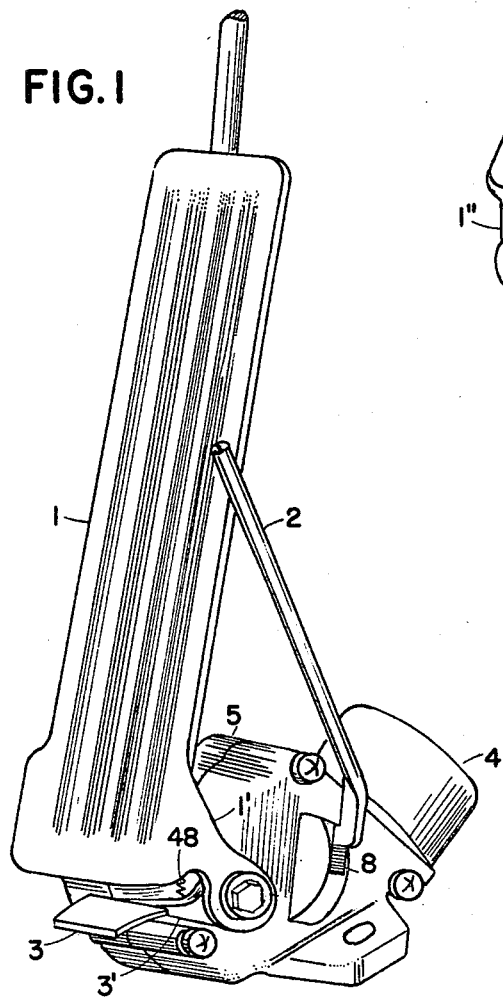
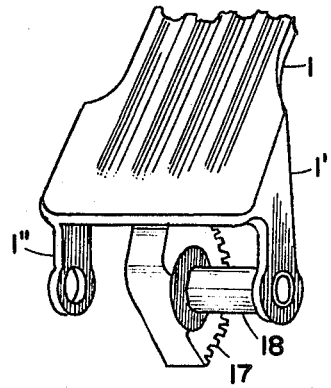
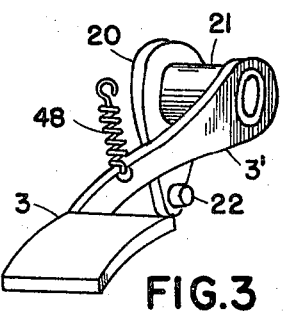
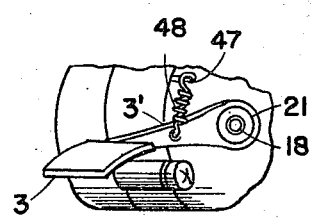
INVENTOR.
Junshiro Shinga
by Sparrow and Sparrow
ATTORNEYS

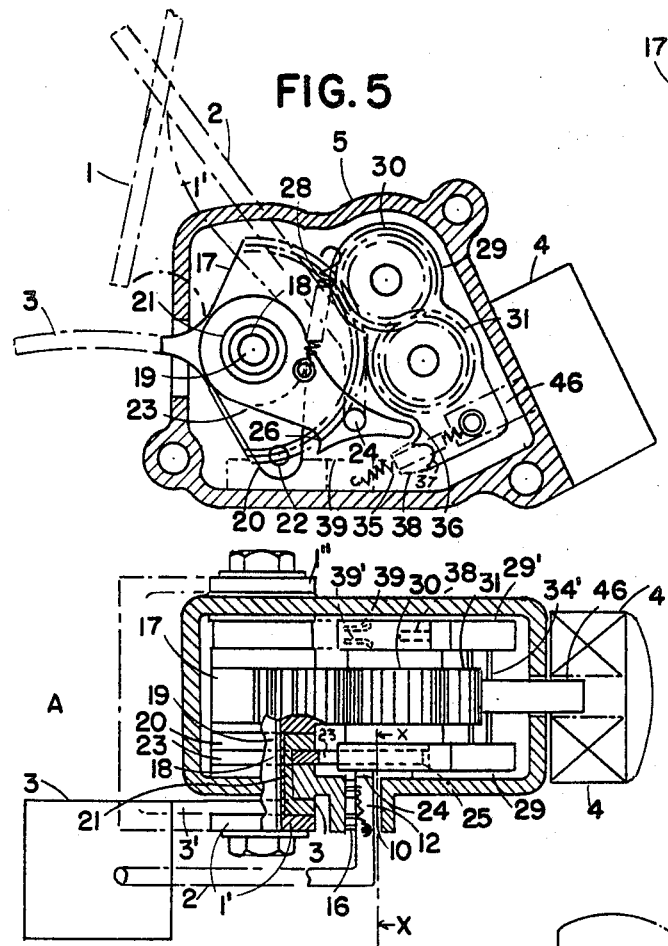
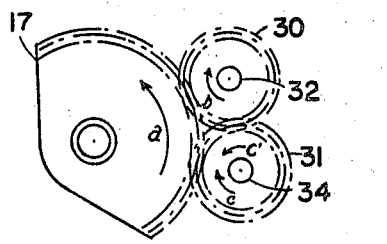
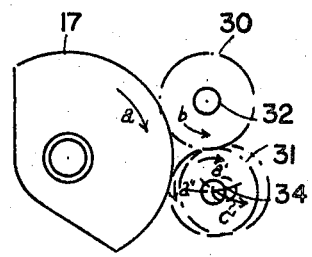
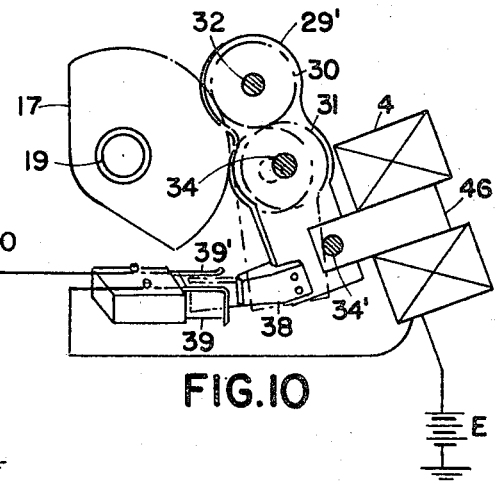

United States Patent Office 3,398,817
Patented Aug. 27, 1968

3,398,817
CONTROL SYSTEM FOR MOTOR VEHICLE
ACCELERATOR PEDAL
Junshiro Shinga, 224 Misecho, Kashihara,
Nara Prefecture, Japan
Filed May 25, 1966, Ser. No. 552,885
Claims priority, application Japan, Oct. 5, 1965,
40/61,177
7 Claims. (Cl. 192—3)

ABSTRACT OF THE DISCLOSURE

Control system for the pivotally mounted accelerator pedal of a motor vehicle in which means are provided for maintaining the accelerator pedal fixed at any position, making it unnecessary for the driver to keep his right foot on it and thus freeing his right foot for operating the brake pedal whenever required; also for making the vehicle run at a uniform speed.

---

This invention relates to a system for controlling the accelerator pedal of a motor vehicle.

The object of this invention is to make it possible, while the automobile is running, both to keep the accelerator fixed at any position and to release it at will.

The driver, while he is driving a motor vehicle, such as an automobile, is generally obliged constantly to keep his right foot on the accelerator pedal pushing it down. As a consequence of this necessity, it is unavoidable that even in an emergency it takes him some time to shift his right foot from the accelerator pedal onto that of the brake, which often causes an accident, such as a collision. When the driver becomes fatigued by constant driving, it is quite natural for him to forget the uniform strength with which he is treading down the accelerator pedal with his right foot and give an unexpected high speed to the car, thus bringing danger to himself and possible damage to the vehicle. Furthermore, on a road of unfavorable surface conditions, where it is impossible to keep a uniform speed, the car frequently slips. It is a purpose of this invention to make it possible in these cases to keep the accelerator pedal fixed, making it unnecessary for the driver to keep his right foot on it, so that, not only can he promptly operate the brake pedal with his right foot whenever the occasion arises, but also can make the vehicle run at a uniform speed. This invention aims at the attainment of the above-mentioned results.

Various further and more specific objects, purposes, features and advantages will clearly appear from the detailed description given below taken in connection with the accompanying drawing which forms part of this specification and which illustrates merely by way of example an embodiment incorporating the invention. Like reference characters denote like parts in the several figures of the drawing, in which:

FIG. 1 is a perspective view showing the external appearance of the system according to the invention;

FIGS. 2, 3 and 4 are, respectively, perspective views of a part of the mechanism of this invention;

FIG. 5 is a side view of a part of the system embodying the invention;

FIG. 6 is a plan figure of the system shown in FIGURE 5;

FIG. 7 is a side view of the part of FIG. 6, seen from the line X—X; and

FIGS. 8, 9 and 10 illustrate the operation of the embodiment of the invention.

Referring now more particularly to the drawings, numeral 1 in FIG. 1 denotes the accelerator pedal which, when pushed down with the right foot, opens the gas valve of the carburetor, and which, when freed from the pressure of the right foot, automatically returns to its original position by the spring attached to the connecting rod of the gas valve of the carburetor. The foot of accelerator pedal 1, as shown in FIGS. 1, 5 and 6, is supported by the supports 1' and 1" which are pivoted at the outside of housing or case 5 on either end of the shaft 19 which extends horizontally through case 5 from side to side. Support 1' is combined, as shown in FIG. 2, by the pipe 18 of the shaft 19 into a body with the gear segment 17 which is supported in case 5 by shaft 19, and gear segment 17 meshes with two gears 30 and 31. Gear 30 is constantly in mesh with gear segment 17 and is supported by shaft 32 which extends through case 5. A movable gear 31 is attached with its shaft to the swingable plates 29 and 29' which swing with shaft 32 of gear 30 as their center so that gear 31 can be moved to engage or disengage with gear segment 17 which remains in mesh with gear 30. As shown in FIG. 8, when gear 30 and movable gear 31 are placed in a position in which they are both engaged with gear segment 17, both gear segment 17 and accelerator pedal 1 become immovable, and on the other hand, when they are placed in a position in which gear 30 alone is engaged with gear segment 17, with movable gear 31 being disengaged, both gear segment 17 and accelerator pedal 1 are positioned where they can move freely. The illustrated mechanism of the invention is a control system controlling the gearing of the three gears 17, 30 and 31.

Numeral 2 in FIG. 1 denotes an accelerator lever set upright at the right side of the accelerator pedal with its foot introduced through the opening 8 into case 5. Lever 2 can move freely to the right and to the left with a pin 10 which is fixed on the side wall of opening 8. Numeral 16 in FIG. 7 denotes a spring pulling accelerator lever 2 towards the top of opening 8. Thus, the head of accelerator lever 2 is influenced by spring 16 always to approach accelerator pedal 1. Numeral 11 in FIG. 7 denotes a lever arm arranged below the part of accelerator lever 2 where it is pivoted by pin 10 in case 5. Numeral 12 denotes a lever having two protrusions, i.e. a protrusion 14 held in engagement with lever arm 11 and another protrusion 15 bearing upon the projection 24. Numeral 23 in FIGS. 5 and 6 denotes a control plate which is fixed to pipe 18 of shaft 19 and which extends downward with its head 25 so that it fits either into a groove 36 or into a groove 37 at the lowest part of swinging plate 29. When head 25 of control plate 23 fits in groove 36, movable gear 31 on shaft 34 between swinging plates 29 and 29' is detached from gear segment 17. When, however, head 25 of control plate 23 fits in groove 37 of swinging plate 29, plate 29 is pulled at its lower part by spring 35 extending between the lower end of swinging plate 29 and the floor of case 5 until movable gear 31 comes into the position where it is in mesh with gear segment 17. Numeral 28 denotes a spring between projections on the side of control plate 23 and on the upper part of case 5. Numeral 24 denotes a projection fixed on the side of control plate 23, which bears upon lever arm 11 with lever 12 placed between them and which lowers, against the force of spring 28, head 25 of control plate 23 by means of accelerator lever 2 and, by the movement of swinging plates 29 and 29', accomplishes the control by engaging gear 31 and gear segment 17 with each other. In FIG. 1, when the driver's foot treading down accelerator pedal 1 shifts a little to the right and moves accelerator lever 2, which projects upright on its right side, to. the right, lever 11 shown in FIG. 7 pushes protrusion 14 of lever 12 to the left, whereby projection 24 by the other protrusion 15 of lever 12 is pushed down. Thus, head 25 of control plate 23 is shifted from groove 36 of swinging plate 29 to the other groove 37 and the movement of swinging plate 29 engages movable gear 31 and gear segment 17 with each other.

FIG. 8, in which movable gear 31 is shifted into a position where it is in mesh with gear segment 17 while gear 30 is in mesh with gear segment 17, illustrates the operation of the three gears 17, 30 and 31 when they are in mesh with one another. Accelerator pedal 1 is properly pushed down by the right foot and the above-mentioned three gears 17, 30 and 31 are shifted into the position where they are in mesh with one another. If now the right foot is taken off the accelerator pedal 1, a rotary power in the direction indicated by the arrow $a$ shown in FIG. 8 acts on gear segment 17 through the connecting rod of the gas valve which is linked to accelerator pedal 1 and at the same time a rotary power in the direction indicated by the arrow $b$ acts on the gear 30 which is in mesh with gear segment 17. Movable gear 31 with which gears 17 and 30 are in mesh, on which the same rotary powers $a$ and $b$ act in the opposite directions as indicated by the arrows $c$ and $c'$, cannot rotate. Consequently, gear segment 17 and gear 30 both stop rotating and accelerator pedal 1 is also fixed as it is combined into one body by means of pipe or tube 18 with gear segment 17 and support 1'.

The position in which head 25 of control plate 23 fits in lower groove 37 of swinging plate 29 and in which movable gear 31 is in mesh with gear segment 17, can be changed by pushing down either the accelerator relaxing pedal 3 shown in FIG. 1 or the brake pedal (not shown here) to the position shown in FIG. 5. Accelerator relaxing pedal 3, as shown in FIG. 1, protrudes over case 5 at the foot of accelerator pedal 1, and is so constructed that it can be operated by treading it down with the right foot. Shaft 19 shown in FIG. 6 is covered with inner and outer tubes or pipes 18 and 21. To the inner end of inner covering pipe 18 is fixed gear segment 17, and to the outer end of pipe 18 is fixed support 1' of accelerator pedal 1. To the outer covering pipe 21 are fixed the cam-shaped lever 20 adjacent to gear segment 17 and a lever-like supporting rod 3' which engages outside of case 5 the support 1' of accelerator pedal 1. To the outer end of the lever-like supporting rod 3' is fixed accelerator relaxing pedal 3.

FIG. 3 shows the mechanism of accelerator relaxing pedal 3, lever-like supporting rod 3', covering pipe 21 and cam-shaped lever 20, all combined into one body. A spring 48 is arranged as shown in FIGS. 3 and 4, between lever-like supporting rod 3' and a point denoted by the numeral 47 on the wall of case 5, so that, when accelerator relaxing pedal 3 is depressed, spring 48 extends, and when the right foot is removed from pedal 3, it returns. Cam-shaped lever 20, as seen in FIG. 5, has a protrusion 22 fixed on the side near its head. When accelerator relaxing pedal 3 is pushed down, cam-shaped lever 20 rotates together with it, and protrusion 22 catches in groove 26 of control plate 23, pushing head 25 of control plate 23 to the right in FIG. 5. In case head 25 of control plate 23 is located in groove 37 of swinging plate 29, protrusion 22 of cam-shaped lever 20 engages groove 26 of control plate 23; and when they are in this position, accelerator relaxing pedal 3, if it is pushed down, pushes by means of cam-shaped lever 20 the head 25 of control plate 23, removing head 25 from groove 37 to groove 36 of swinging plate 29 so that gear segment 17 and movable gear 31 are separated from each other.

Swinging plate 29', having the same shape of swinging plate 29, and being attached on the opposite side of plate 29 for holding both gear 30 and movable gear 31 in the middle between them has at its lowest end fixed, as shown in FIGS. 5 and 6 with a dotted line and shown in FIG. 10 with a solid line, a movable contractor 38 which is interposed in the circuit of a magnetic coil 4 which is arranged on the wall of case 5. When accelerator lever 2 is operated to control by way of control plate 23 swinging plate 29, thereby setting movable gear 31 and gear segment 17 in mesh with each other for fixing of accelerator pedal 1, swinging plate 29', moving together with swinging plate 29, inserts the movable contactor 38 as shown in FIG. 10 between the contactors 39 and 39' which are attached to the floor of case 5, for forming a short-circuit in them, when the circuit is closed. Numeral 40 denotes a circuit breaker attached to the brake pedal 50 (FIG. 10). The brake pedal 50 is pushed down to send pressurized oil to the braking device of the wheels of the automobile. Usually, a play is necessarily provided in the downstroke of the brake pedal so that when the brake pedal is pushed down, the oil pressure does not go up till the play is overcome; but according to the invention, at the moment when the operation begins to push down the brake pedal 50 for operating the brake, circuit breaker 40 is closed and the circuit of magnetic coil 4 is closed whereby coil 4 is excited by electric battery E. Together with an iron core 46, when it is attracted by the excitement of the magnetic coil 4, swinging plates 29 and 29', since they are connected by a coupling pin 34' with the lower part of iron core 46, are moved to the right. At this instant, movable contactor 38 disconnects itself from contactors 39 and 39', causing the excitement action to disappear. Swinging plate 29 is ready to return to the left by spring 35, but at the same time, control plate 23 remains in the position shown in FIGS. 5 and 10, with its head 25 removed by spring 28 from groove 37 of swinging plate 29 to the other groove 36, thus disengaging gear segment 17 and movable gear 31 from each other and relaxing the fixation of accelerator pedal 1 so as to operate the engine brake. When the brake pedal 50 is pushed farther down, the oil pressure is raised to complete the perfect stopping of the vehicle. FIG. 9 illustrates the action when accelerator pedal 1 is slowly pushed down to accelerate the speed of the car while it is running at a uniform speed with accelerator pedal 1 kept at a fixed position. In FIG. 8, rotary power in the direction indicated by arrow $a$ acts on gear segment 17 by the spring which acts on accelerator pedal 1, but in FIG. 9, when gear segment 17 is rotated by the force of the right foot treading down accelerator pedal 1 against the spring force, the rotary power acting on it is of the opposite direction indicated by arrow $a'$ to that shown in FIG. 8. Two rotary powers $a'$ and $a''$ quite opposite each other are imposed over gear segment 17 and over gear 30 separately, because both gears are in mesh with movable gear 31. In this case, the rotary power is opposed to that shown in FIG. 8, which, considered in point of vector, has the tendency to be composed to kick out movable gear 31 in the direction indicated by arrow $c'$ in FIG. 9. When accelerator pedal 1 is gradually pushed down, the gear segment 17, rotating tooth by tooth, can cause the acceleration of the speed of the car.

With the device of this invention, it is possible to fix accelerator pedal 1 in any position by operating accelerator lever 2, and the driver can keep his right foot off accelerator pedal 1 while the car is speeding. Consequently, in case of an emergency, the driver, saved from the labor of his right foot shifting from accelerator pedal 1 to that of the brake, can promptly tread down the brake pedal causing the controlling action quickly to take place. At the same time, at the instant when the brake pedal is pushed down, the exciting circuit of magnetic coil 4, shown in FIG. 10, is closed, and before the action of the pressurized oil begins to work which is retarded by the play of the brake pedal, the fixation of accelerator pedal 1 is released to put on the engine brake and bring the vehicle to an emergency stop with certainty and promptness. Thus, it is one of the advantages of the present invention that it can lessen the possibilities of dangerous accidents. While the vehicle is speeding on an expressway, it is not rare for the driver, due to fatigue of the right foot or to mental fatigue, unconsciously to considerably accelerate the speed of the vehicle. On a muddy road or on a road deeply covered with snow or on a sandy or gravel road along the seashore, the vehicle will often slip or sink into the ground, unless it is kept at a uniform speed. In climbing a slope or in going down a long hill, the vehicle is liable to suffer great and dangerous irregularities in speed, but with the device of the present invention, it is possible for the driver to maintain the vehicle at a uniform speed best for the conditions of the road, keeping his right foot ready for the brake pedal in an emergency. Thus, he can always drive the vehicle with safety, which is another advantage of the present invention.

While the invention has been described and illustrated with respect to a certain preferred example thereof, it will be understood by those skilled in the art after understanding the principle of the invention, that various changes and modifications may be made without departing from the spirit and scope of the invention, and it is intended therefore in the appended claims to cover all such changes and modifications.

I claim:

1. Control system for the accelerator pedal of a motor vehicle having a brake pedal, said accelerator pedal being pivotally mounted on a first shaft; comprising a gear segment attached to said accelerator pedal for rotation therewith, a second shaft arranged parallel to said first shaft, two swingable plates suspended from said second shaft, two gears rotatably mounted between said plates, the first one of said gears being in mesh with said gear segment, the second one of said gears being in mesh with said first one of said gears, first means for engaging said second gear with said gear segment for immobilizing said accelerator pedal in a set position, second means for disengaging said second gear from said gear segment releasing said accelerator pedal from fixed position thereof, electromagnetic means connected with said swingable plates, and electric contact means on said brake pedal for energizing said electromagnetic means for instantaneously disengaging said second gear from said gear segment upon operation of said brake pedal.

2. Control system for the accelerator pedal of a motor vehicle according to claim 1, wherein said second means is mechanically operated.

3. Control system for the accelerator pedal of a motor vehicle according to claim 1, said first means comprising a control plate having a head, said plate being rotatably mounted on said first shaft, one of said swingable plates having two grooves, said head engaging either one of said grooves, and a shiftable accelerator lever arranged on one side of said accelerator pedal, said lever actuating said control plate.

4. Control system for the accelerator pedal of a motor vehicle according to claim 3, said second means comprising a foot-operated lever, said lever being freely rotatably mounted on said first shaft, and said lever having a protrusion, said protrusion engaging said control plate for actuating said control plate for shifting said head from one of said grooves to the other, thereby causing said second gear to be disengaged from said gear segment.

5. Control system for the accelerator pedal of a motor vehicle according to claim 3, said electromagnetic means comprising a solenoid having an iron core, said iron core being attached to said swingable plates and an electric contactor attached to one of said swingable plates, said contactor closing the electric circuit of said solenoid for enabling said electric contact means on said brake pedal to energize said solenoid.

6. Control system for the accelerator pedal of a motor vehicle according to claim 4, said electromagnetic means comprising a solenoid having an iron core, said iron core being attached to said swingable plates and an electric contactor attached to one of said swingable plates, said contactor closing the electric circuit of said solenoid for enabling said electric contact means on said brake pedal to energize said solenoid.

7. Control system for the accelerator pedal of a motor vehicle according to claim 1, said first means comprising a control plate rotatably mounted on said first shaft, said second means comprising a lever rotatably mounted on said first shaft and engaging said control plate for actuating the latter.

References Cited

UNITED STATES PATENTS

| | | | |
|---|---|---|---|
| 1,468,378 | 9/1923 | Cummings | 74—513 |
| 2,533,836 | 12/1950 | Patterson | 192—3 XR |
| 2,638,016 | 5/1953 | Munson | 192—3 XR |

BENJAMIN W. WYCHE III, *Primary Examiner.*